Nov. 30, 1965 M. J. WALKER 3,220,889

ELECTRICAL CIRCUIT COMPONENTS

Filed Aug. 2, 1962

INVENTOR.
MAURO J. WALKER
BY Albert H. Churland
ATTORNEY 3,220,889

ELECTRICAL CIRCUIT COMPONENTS

Mauro J. Walker, Lansdale, Pa., assignor to Philco Corporation, Philadelphia, Pa., a corporation of Delaware Filed Aug. 2, 1962, Ser. No. 214,382
5 Claims. (Cl. 148—6.3)

This invention relates to electrical circuit components and more particularly to the production of thin film resistors such as are incorporated in microelectronic circuits.

According to recently developed techniques microelectronic circuits including resistor portions and integral interconnecting portions are obtained by means of laminated structures consisting of a tantalum film deposited on a smooth glass substrate and overlaid with a thin gold layer. To form such a circuit, areas of gold-overlaid tantalum are first removed in conformity with a predetermined pattern, and thereafter the gold layer is removed from the tantalum at those sections of the circuit pattern where a resistor is desired, the gold being left on the tantalum at those sections of the pattern where a connection is to appear.

It is common knowledge that tantalum normally reacts with oxygen to form a surface coating of oxide and that the electrical resistance of the tantalum increases as the oxide coating deepens. These phenomena are utilized in the above mentioned known techniques to form film resistors, and, in order to accelerate oxidation of these resistors, it has been the practice to place circuit structures with exposed tantalum resistor portions in an oven and there to treat these portions in an atmosphere maintained at elevated temperature. However, such thermal treatment lacks the control necessary to insure the production of precision resistance networks in which it is most critical that specified ohmic values be maintained within exceedingly close tolerances.

Accordingly it is a main object of the present invention to provide a novel method whereby thin-film resistors, in a microelectronic structure, can be precision-adjusted to desired resistance values.

It is also an object of the invention to provide a method which makes it possible to control the formation of thin-film resistors with such a high degree of accuracy as to effect extraordinary reductions in allowable deviations from specified ohmic values.

Another and more particular object of the invention has to do with the provision of a method which produces a plurality of closely adjacent precision-adjusted thin-film tantalum resistors within an integrated circuit on a glass substrate and which makes it possible to effect individual adjustment of each of the closely adjacent thin-film tantalum resistors.

It is a further feature of the invention that the individual resistors can be subjected to thermal treatment at comparatively high heat intensity to realize the desired precision adjustment without danger of destroying the substrate or burning out the circuit thereon.

These general objectives, as well as other characteristic features and advantages which will appear as the description progresses, are achieved by the method of the invention, in which thin-film resistors provided on an insulating substrate are exposed in an oxygen-containing environment and, while so exposed, any selected resistor may be simultaneously heated internally and subjected to convective heat dissipation to reduce or eliminate the thermal gradient throughout the length of the resistor being treated. Internal heating is accomplished by electrically overloading the resistor and convective heat dissipation is carried out by flowing air over the exposed surfaces of the substrate and resistors thereon. Where such a method is employed the oxidation of the resistor being treated is accurately controlled, with the result that the ohmic value of the resistor is brought to a fine precision adjustment.

The invention, and its characteristic features and advantages will be more fully understood from the following description taken in conjunction with the accompanying drawings in which.

Figures 1, 1A, 2:
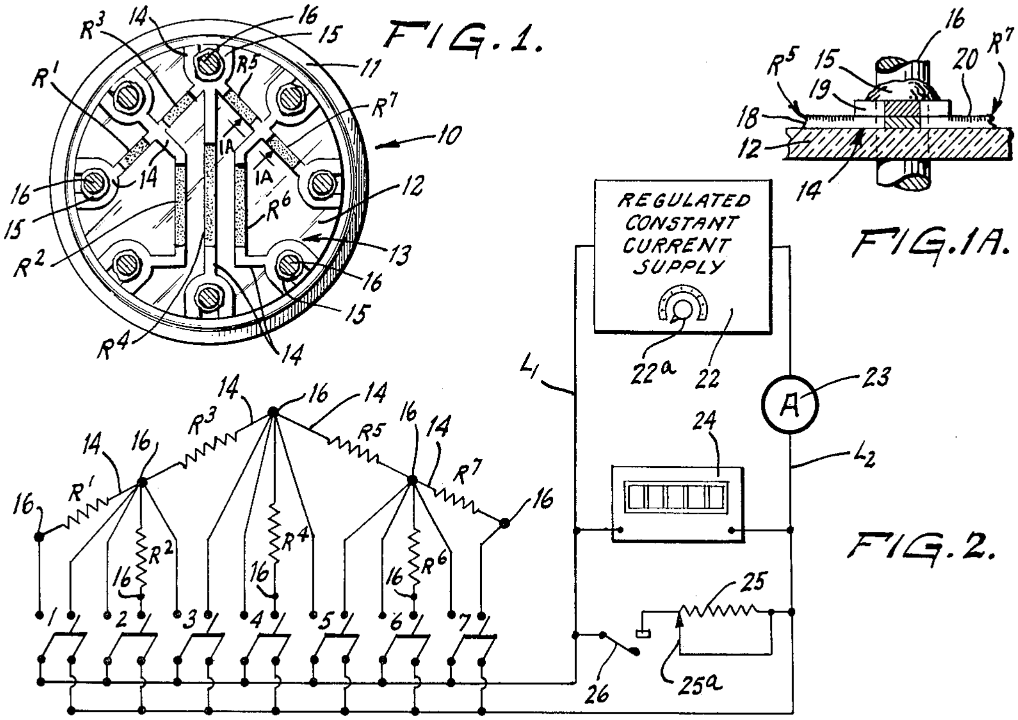
FIGURE 1 is a plan view of one form of microelectronic circuit structure with which the method of the present invention is advantageously employed.
FIGURE 1A is an enlarged fragmentary sectional view looking in the general direction of arrows 1A—1A of FIGURE 1.
FIGURE 2 is a schematic view illustrating electrical means whereby the resistor portions of the circuit structure shown in FIGURE 1 can be electrically overloaded to effect controlled internal heating of each resistor in accordance with the method of the invention.
Figures 3, 4:
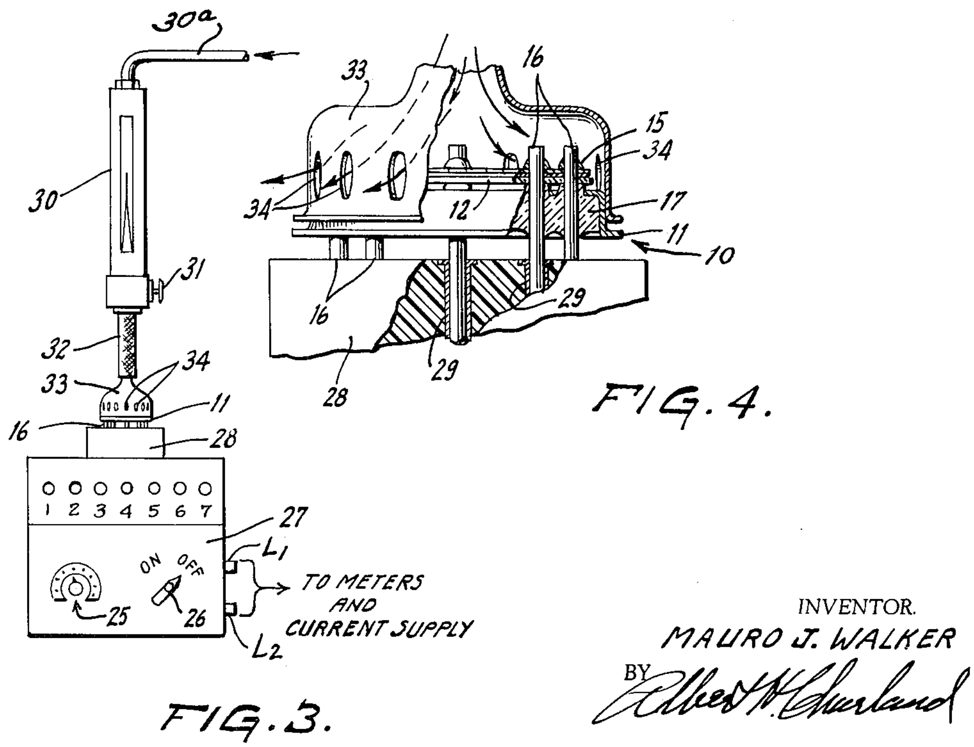

FIGURE 3 is a front elevational view of apparatus which conveniently incorporate the switches and the rheostat schematically illustrated in FIGURE 2, and showing the preferred manner in which the resistor portions are subjected to convective heat dissipation in accordance with the method of the invention; and FIGURE 4 is an enlarged elevational-sectional view illustrating parts of the apparatus shown in FIGURE 2 in association with the circuit structure shown in FIGURE 1.

With more particular reference to the drawing, there is illustrated in FIGURE 1 a microelectronic circuit structure 10 which comprises a support 11, a smooth glass substrate 12 disposed on said support, and a circuit pattern 13 formed on said substrate. The circuit pattern 13 includes a plurality of film resistor portions designated $R^1$ through $R^7$ electrically connected by means of conductive legs 14 and solder 15 to terminal pins 16 which, as seen in FIGURE 4, arembedded in a glass base 17 formed in the support 11 so as to be insulated from each other and from said support.

As shown in FIGURE 1 and as best seen in FIGURE 1A, the aforesaid resistor portions and conductive leg portions are constructed from laminated film materials consisting of an inner layer 18 of tantalum deposited upon the glass substrate 12 and an outer layer 19 of gold applied over the tantalum, the circuit pattern being obtained in the customary manner by removing areas of the two superposed layers so as to leave on the substrate an array of strips constituting the desired pattern, and thereafter removing the gold and retaining the tantalum at those sections of the strips where the resistor portions are to appear while retaining the gold and tantalum at those sections of the strips which are to constitute the conductive legs. By natural process, the tantalum exposed by removal of the gold combines with oxygen in ambient atmosphere and is converted into insulating tantalum oxide which appears as a coating 20 at the exposed surface of the tantalum layer 18.

The conversion of part of the tantalum into tantalum oxide affects the electrical resistance of the tantalum layer so as to increase its ohmic value and, in order to accelerate the conversion. the resistor portions are subjected to external heating in the aforesaid customary manner. While this external heating can afford some adjustment of the resistor portions, its adjusting function is restricted because, in order to protect the resistor portions and supporting substrate against adverse effect of elevated temperature, the external heating cannot exceed a given temperature range which is insufficient to permit proper control required for production of precision adjusted resistance. Moreover, the external heating process referred to above is incapable of precision-adjusting each of a plurality of film resistor portions in one circuit pattern since, in such process, all the resistor portions are treated simultaneously, at the same temperature level.

In particular accordance with the present invention, a resistor portion is treated in a manner which induces controlled development of the oxide layer coating 20 to effect an increase in the resistance of the resistor or portion being treated, without danger of injury thereto. This treatment, in accordance with the method of the invention, is carried out with exactitude so as to produce resistor portions having precision-adjusted resistance.

To accomplish these characteristic features of the invention, the circuit structure 10 is first supported so as to expose the substrate and resistor portions $R^1$–$R^7$ thereon to a medium capable of picking up and conveying heat away from said substrate and resistor portions. With the substrate and resistor portions so exposed, each resistor portion is then individually subjected to internal heating obtained by electrically overloading the resistor portion by flowing therethrough current from a regulated constant current supply. The electrical overloading is accomplished progressively by causing the current to flow through the resistor portion at gradually increasing amperage so as to protect the circuit structure against deleterious effects due to sudden application of current at full force.

It will be understood that while some of the heat in the resistance portion being treated is dissipated by conduction through the glass substrate and surrounding structure of the support 11 and, to a lesser extent, by radiation, most of the heat is dissipated by convection through the aforesaid medium which functions to pick up and convey heat away from the resistor portion. This convective heat dissipation has the effect of lowering the heat gradient along the length of the resistor portion being electrically heated and thus protect the same against the destructive effect of elevated temperature. The desired convective heat dissipation can be and preferably is accomplished by discharging onto the circuit structure, an adjusted flow of air which is caused to circulate in intimate heat exchange relation with the substrate 12 and the resistor portions formed thereon, and which supplies the oxygen necessary to provide for oxidation at the surface of the resistor portion in the manner hereinbefore mentioned.

An arrangement suitable for use in effecting internal heating in accordance with the method of the invention is illustrated in FIGURE 2. Referring to this figure, it will be seen that the several resistor portions $R^1$–$R^7$ are represented schematically. As represented the resistor portions are electrically coupled to a series of individually operable control switches which are designated 1 through 7 and which are schematically illustrated as double-pole, single-throw switches. These switches are connected through lines $L_1$ and $L_2$ to a constant current supply 22 which is provided with a current regulator 22_a_, so that closing of any one control switch will selectively establish connection between said current supply and the particular resistor portion which is coupled to that one switch.

Incorporated in the circuit between the switches 1–7 and the current supply 22 are an ammeter 23, a voltmeter 24 preferably of the digital type, and a current transfer rheostat 25 provided with its customary control arm 25_a_ and including an on-and-off shunting switch 26.

When using this arrangement, the current transfer rheostat 25 which has a minimum resistance value small compared with the resistance value of the individual resistor portions and a maximum resistance value preferably greater than the resistance value of said portions, is first set at its minimum resistance value. Thus, the shunting switch 26 being closed, and the control switches 1–7 being open, all the current from the constant current supply 22 will flow through the rheostat 25. The strength of the current from the supply 22 can accurately be determined from a reading of the ammeter 23, the current regulator 22_a_ providing for current of desired amperage. Under these conditions, assuming that resistor portion $R^1$ is selected for treatment, then control switch 1 is closed so that said resistor portion is placed in the circuit of the regulated constant current supply. In this respect, it will be recognized that the current initially fed to the resistor portion is of reduced amperage due to the setting of rheostat 25 at its low resistance value. In this manner injury to or destruction of the circuit structure as a possible result of the application of current at full amperage is effectively prevented.

After the switch 1 has been closed, the rheostat control arm 25_a_ is displaced in a direction to effect progressive increase in the resistance of the rheostat so that current from the constant current supply 22 is gradually transferred to the resistor portion $R^1$ to effect gradual internal heating thereof. At this stage of the procedure, the reading of the voltmeter 24 will indicate the voltage drop across the resistor portion $R^1$ together with the voltage drop across the rheostat 25 and, since the current flowing through the circuit is constant and of known amperage, the reading of the voltmeter can be interpreted in terms of resistance. Accordingly accurate reading of the resistance value of the resistor portion $R^1$ alone can easily be determined by opening the shunting switch 26 thereby removing rheostat 25 from the circuit.

As illustrated in FIGURE 3, the control switches 1–7, the current transfer rheostat 25 and the shunting switch 26 are conveniently housed in a switch box 27 into which lines $L_1$ and $L_2$ are connected. The switch box 27 includes a connector plug 28 which, as seen in FIGURE 4, is provided with conductive connectors 29 adapted to receive the terminal pins 16 of the circuit structure 12 and to establish electrical coupling between said pins and the appropriate control switches 1–7.

A suitable arrangement for effecting convective heat dissipation during internal heating of the resistor portions in the manner described above, is illustrated in FIGURES 3 and 4. This arrangement comprises a flow meter 30 connected by means of an inlet conduit 30_a_ to a suitable air supply, such as a conventional air pump (not shown). A valve 31 is arranged on the flow meter to regulate the flow of air through an outlet duct 32, the latter being supplied with a discharge nozzle in the form of a cap 33. This cap, as best seen in FIGURE 4, is constructed to fit snugly on the side of the circuit structure 10 so as completely to enclose the glass substrate 12 and the circuit pattern 13 thereon, and has a row of apertures 34 disposed to provide for circulation of air over said substrate and pattern, so as to pick up and entrain heat therefrom, thereby effecting the above mentioned lowering of the heat gradient throughout the length of the resistor portion being internally heated.

While it is appreciated that some benefits can be gained by electrically overloading the thin-film resistor in the absence of convective dissipation of heat therefrom, the use of convective heat transfer, in accordance with the invention, results in substantial and unobvious advantages, particularly when the resistor is of elongate form. The truth of this can be seen when it is recognized that conductive dissipation to the substrate necessarily takes place to a lesser degree from any central area of the resistor, than takes place from end portions of like area. Since radiative dissipation is very slight, owing to the small temperature difference, it can be seen that an appreciable and deleterious temperature gradient continues to exist between the central portion of the resistor and each of its end portions.

I have discovered that convective heat dissipation is not subject to the limitations mentioned above and that, when proper provision is made to ensure convective dissipation of the heat, the undesirable and deleterious temperature gradient along the length of the resistor can be eliminated.

This effect occurs because convective heat dissipation minimizes the formation of exceedingly high temperatures at an area small compared to the overall area of the resistor portion which normally results in the resistor burning open. The mentioned lowering of heat gradient also has the effect of minimizing thermal stress in the substrate and accordingly eliminating the danger of damage to the substrate.

From the foregoing description it will be recognized that the invention provides a simple yet reliable technique whereby a thin-film resistor portion on a component mounting substrate can be precision-adjusted to a specific resistance value beyond that obtained by the customary external heating process. For example, in multi-resistor networks, individual thin film resistor portions of relatively high resistance value, e.g. 500 ohm–1000 ohm, can be produced with a maximum deviation of less than 0.1% from predicted absolute value.

While the invention has been described with particular reference to specific practices and embodiments, it will be recognized that these practices and embodiments are susceptible of modifications without departing from the gist of the invention. Accordingly it should be understood that the details of the illustrated and described practices and embodiments are not to be construed as limitative of the invention, except insofar as is consistent with the scope of the appended claims.

What I claim is:

1. In the method of precision adjusting the electrical resistance of a thin film resistor of tantalum, subjecting said resistor to controlled internal heating and convective heat dissipation, by the steps which comprise: electrically overloading the resistor in the presence of oxygen to oxidize said resistor; and concurrently minimizing heat gradients in the resistor by flowing oxygen-containing gaseous medium over the resistor.

2. In the method of precision adjusting the electrical resistance of a thin film tantalum resistor, subjecting said resistor to controlled heating and convective heat dissipation by the steps which comprise: passing electric current through the resistor at gradually increasing amperage, in the presence of oxygen, to heat the film and develop an oxide coating on the same while protecting the film against deleterious effects of sudden full application of the heating current; minimizing local overheating and excessive oxidation of the film by forceably circulating oxygen-containing gaseous medium over the film; and interrupting the flow of current when the desired value of resistance has been attained.

3. In the method described in claim 2, supporting the thin film tantalum resistor by a glass substrate, and cooling said substrate adjacent said resistor by said circulating gaseous medium.

4. A method of fabricating a precision adjusted electronic resistor, comprising the steps of passing electric current through a thin film tantalum strip to internally heat the strip, and forceably moving a fluid medium, containing oxygen, over a surface of the heated strip in convectively heat dissipating relation to said surface, thereby promoting oxidation of said surface while minimizing excessive local heating and oxidizing of portions thereof.

5. A method as described in claim 4 wherein said resistor is one of a plurality of thin film tantalum strips adherent to an insulating carrier, with minute distances between the strips, the method including individually adjusting the amperage of said electric current passing through each strip, and gradually increasing each amperage during an initial portion of application of the current.

References Cited by the Examiner

UNITED STATES PATENTS

| | | | |
|---|---|---|---|
| 1,142,172 | 6/1915 | Jacoby | 148—6.3 X |
| 1,880,937 | 10/1932 | Elsey | 148—6.3 |
| 2,531,382 | 11/1950 | Arditi | 148—6.3 |
| 2,934,670 | 4/1960 | Gingrande. | |

FOREIGN PATENTS

| | | |
|---|---|---|
| 403,763 | 1/1934 | Great Britain. |

RICHARD D. NEVIUS, *Primary Examiner.*

WILLIAM D. MARTIN, *Examiner.*